Oct. 20, 1970
JAMES E. WEBB
ADMINISTRATOR OF THE NATIONAL AERONAUTICS
AND SPACE ADMINISTRATION
INTEROFEROMETER DIRECTION SENSOR
3,535,041
Filed April 4, 1968
3 Sheets-Sheet 1
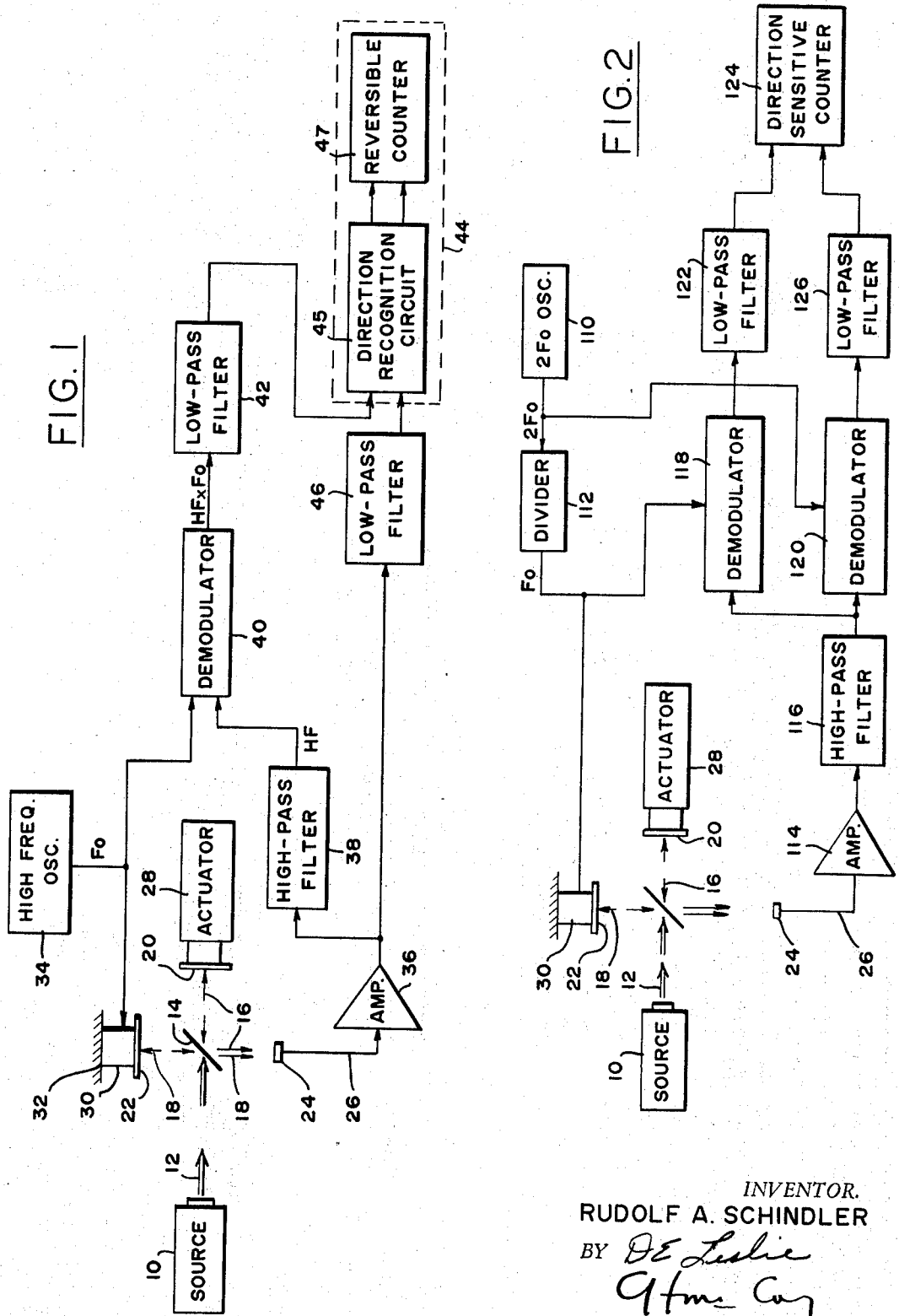
INVENTOR.
RUDOLF A. SCHINDLER
BY
ATTORNEYS

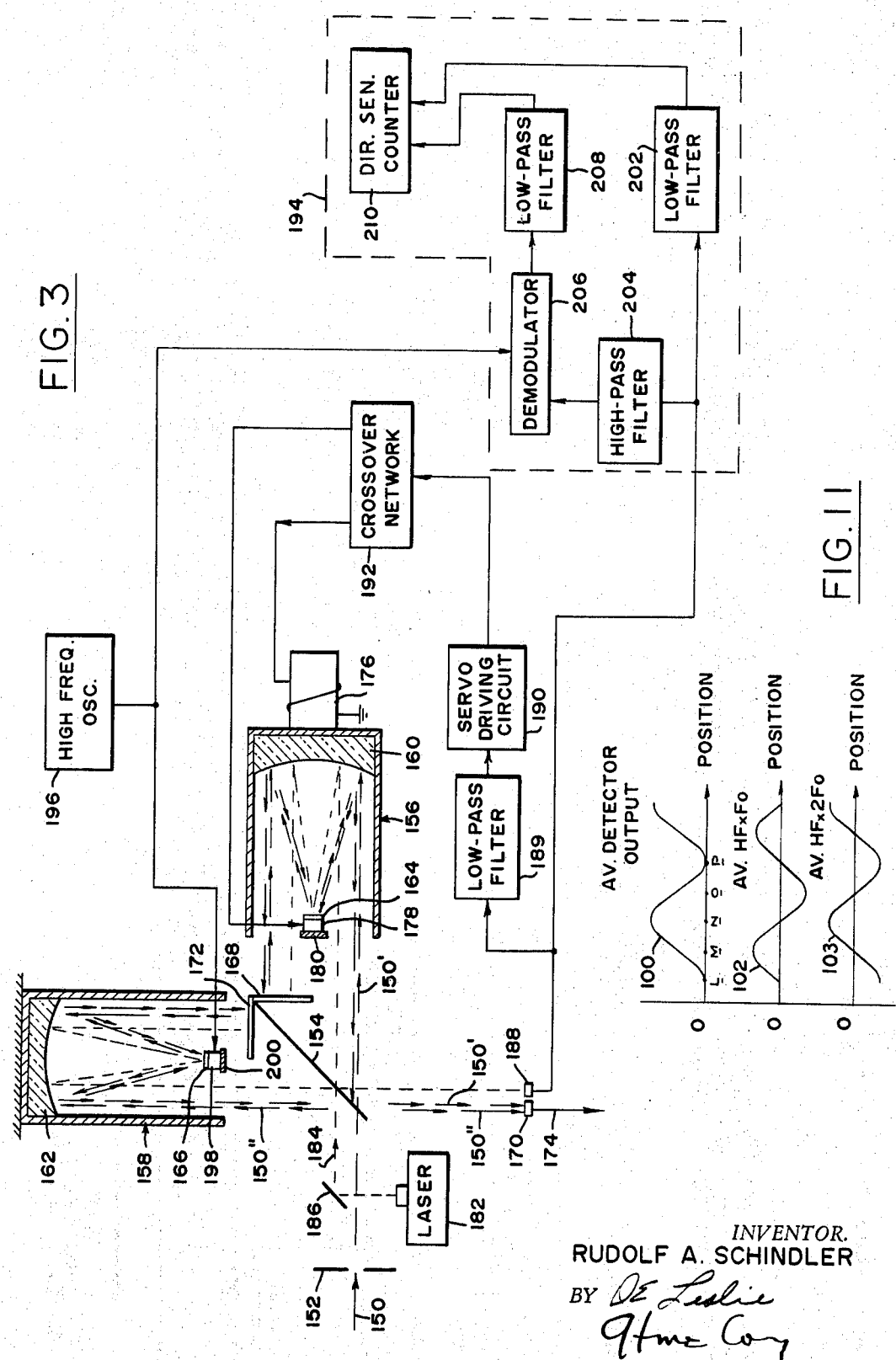

Oct. 20, 1970 JAMES E. WEBB 3,535,041
ADMINISTRATOR OF THE NATIONAL AERONAUTICS
AND SPACE ADMINISTRATION
INTERFEROMETER DIRECTION SENSOR
Filed April 4, 1968
3 Sheets-Sheet 3
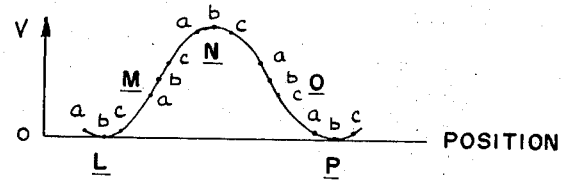
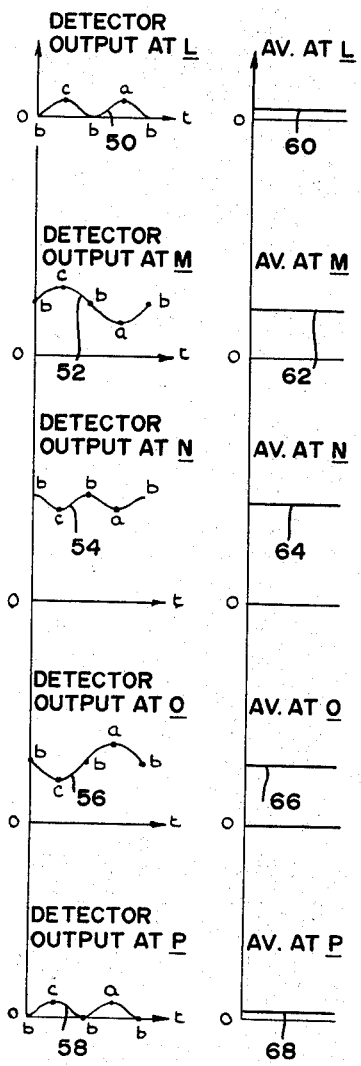
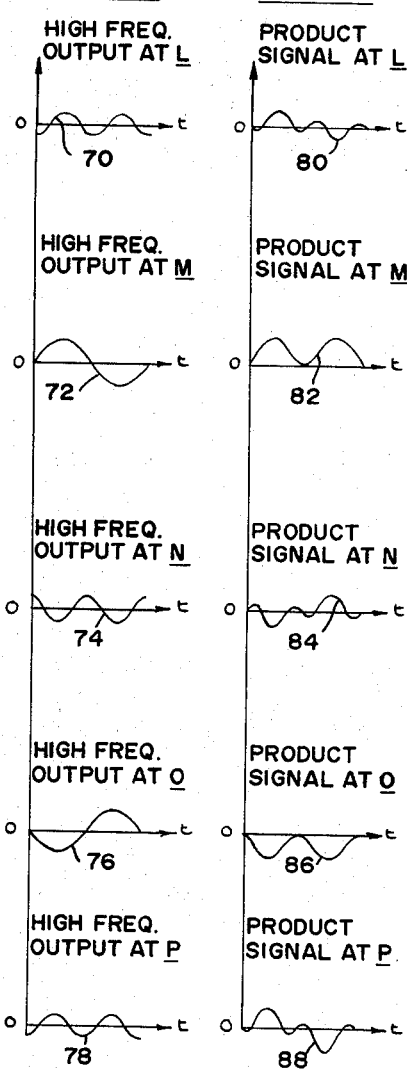
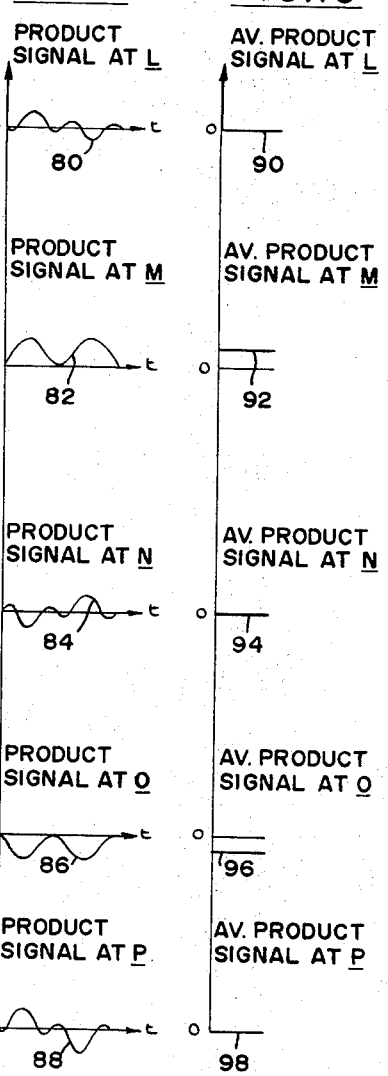
INVENTOR.
RUDOLF A. SCHINDLER
BY
ATTORNEYS

United States Patent Office 3,535,041
Patented Oct. 20, 1970

3,535,041
INTERFEROMETER DIRECTION SENSOR
James E. Webb, Administrator of the National Aeronautics and Space Administration with respect to an invention of Rudolf A. Schindler, Pasadena, Calif.
Filed Apr. 4, 1968, Ser. No. 718,689
Int. Cl. G01b 9/02
U.S. Cl. 356—106                                  5 Claims

ABSTRACT OF THE DISCLOSURE

Apparatus is disclosed suitable for sensing the direction of movement of an interferometer mirror. The apparatus comprises a high frequency oscillator for vibrating one of the mirrors with a small amplitude along the optical path. The output of a fringe detector is demodulated by a signal from the high frequency oscillator to derive a product signal. The average value of the product signal is 90° out of phase with the average fringe detector output, as both vary with the position of the movable interferometer mirror. These two signals which are 90° out of phase are delivered to a direction recognition circuit to sense direction of movement of the movable mirror. The direction recognition circuit drives a reversible counter which indicates the net movement of the movable mirror.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention relates to interferometers and, more particularly, to a system for sensing the direction of mirror movement in interferometers.

Description of the prior art

Interferometers are instruments which can be used to measure a linear distance with great accuracy, or, conversely, to measure the wavelength of radiation with great accuracy. The Michelson interferometer is a well known type which splits a monochromatic light beam into two portions by a semi-reflecting surface. The two beam portions then travel over two different paths. Each beam portion travels towards a mirror which reflects it back toward the semi-reflecting surface. The two beam portions are then combined to fall on a photodetector, where they produce fringes.

The fringes produced at the photodetector indicate the difference in path length traversed by the two beam portions which travel to the two different mirrors. As the path difference varies, the position of the fringes moves. Each movement of the fringes by a width of one fringe represents a change of path difference of one wavelength of the monochromatic light beam. If the photodetector responds to light in only a small area covering a small portion of a fringe, it can detect the fact that the fringes are moving. This is because the amount of light incident on the photodetector decreases towards a minimum and then begins to increase each time the dark area of a fringe is passed.

In one type of interferometer, one of the mirrors is relatively fixed in position, while the other is attached to an actuator for moving it along the optical path. By counting the number of fringes traversing the photodetector, it is possible to determine, with high precision, the amount of movement of the movable mirror.

If the movable mirror always moved in one direction from a starting point, a simple count of the number of variations between the minimum and maximum outputs of the photodetector would indicate the precise position of the movable mirror. However, the movable mirror may sometimes move in one direction and sometimes move in the other direction. It is difficult to determine when the movable mirror is reversing its direction of movement merely from the output of one photodetector. This is particularly true where the reversals occur near a minimum or maximum of fringe amplitude, that is, at points near the darkest or brightest portions of the fringes.

Systems are known which enable the sensing of the direction of mirror movement. However, such systems generally employ at least one additional photodetector. The photodetectors are generally photomultiplier tubes, and additional photomultiplier tubes greatly increase the complexity of the system.

OBJECTS AND SUMMARY OF THE INVENTION

One object of the invention is to provide simplified apparatus for enabling an accurate determination of the position of a movable mirror in an interferometer.

Another object of the invention is to provide an interferometer having more accurate and reliable means for sensing the direction of change of path length differences therein.

In accordance with the present invention, circuit means are provided suitable for sensing the direction of movement of a movable interferometer mirror. The interferometer also includes a fixed mirror, which is mounted on a transducer. A high frequency oscillator drives the transducer to thus vibrate the fixed mirror with a small amplitude parallel to its optical path. A photodetector detects the amplitude of light at a small area of the fringes created by the recombined beams.

Movement of the movable mirror is indicated by the photodetector whose average output passes through a minimum each time the darkest part of a fringe is passed. In order to determine the direction of motion of the movable mirror, the apparatus of the invention is constructed to provide a second signal which varies in accordance with the movement of the fringes across the photodetector, but which varies out of phase, preferably 90° out of phase, (i.e., in quadrature) with the variations in the average detector output. Thus, as the average detector output passes through a minimum (at the darkest part of a fringe), the second signal passes through a value inbetween its maximum and minimum values. These two quadrature signals are used by a direction recognition circuit to sense the direction of mirror movement, and thereby operate a reversible counter that indicates the net movement of the movable mirror.

The apparatus of the invention provides means for obtaining the second signal, which is in quadrature with the average detector output. Basically, the second signal is obtained by comparing the high frequency component of the detector output with the output of the high frequency oscillator which vibrates the fixed mirror.

In one embodiment of the invention, the output of the high frequency oscillator, which vibrates the fixed mirror, is multiplied by the output of the photodetector. The resulting product signal is passed through a low-pass filter to derive the average value of the product signal. This average product signal varies in amplitude as the movable mirror moves. For a given rate of mirror movement, the frequency of variation of the average product signal is the same as the frequency of variation of the average signal obtained directly from the photodetector. However, they are 90° out of phase. Thus, when the darkest part of a fringe is on the photodetector so that its average output is a minimum, the average product signal is at a level inbetween its maximum and minimum. These two average value signals are delivered to a direction recognition circuit which drives a reversible counter to determine the net movement of the movable mirror.

In another embodiment of the invention, a second harmonic signal is used instead of the average value output obtained directly from the photodetector. This embodiment is based upon the fact that the output of the photodetector includes the second harmonic of the oscillator fundamental frequency used to vibrate the fixed mirror. The phase of the second harmonic varies as the fringes move over the photodetector. This variation in the second harmonic is 90° out of phase with the variations of the component in the detector output which is of the oscillator fundamental frequency.

In this second embodiment of the invention, the oscillator which vibrates the fixed mirror is driven by a second harmonic generator whose output is divided by two before delivery to the fixed mirror. The output of the second harmonic generator is multiplied by the output from the photodetector. The second harmonic product created thereby has an average value which varies in phase with the average output obtained directly from the photodetector. Thus, the second harmonic product can be passed through a low-pass filter to obtain a signal which varies 90° out of phase with the average value of the oscillator-frequency signal. The average second harmonic signal is entered in the direction recognition circuit in place of the average value obtained directly from the photodetector.

BRIEF DESCRIPTION OF THE DRAWINGS

FIG. 1 is a block diagram of an interferometer direction sensor constructed in accordance with the invention;

FIG. 2 is a block diagram of another embodiment of the invention;

FIG. 3 is a block diagram of still another embodiment of the invention;

FIG. 4 is a graph showing the photodetector output at various positions of the movable mirror;

FIG. 5 illustrates the waveform of the fixed mirror driving signal;

FIG. 6 illustrates the detector output waveforms at various positions of the movable mirror;

FIG. 7 illustrates the average value of the detector output signals of FIG. 6;

FIG. 8 illustrates the high frequency components of the detector output signals of FIG. 6;

FIG. 9 illustrates the product of the oscillator signal and the high frequency detector output signals of FIG. 8;

FIG. 10 indicates the average values of the product signals of FIG. 9; and

FIG. 11 illustrates the phase relationship between various signals generated by the apparatus of the invention.

DESCRIPTION OF THE PREFERRED EMBODIMENTS

FIG. 1 illustrates an interferometer comprising a monochromatic source 10, such as a laser, whose output beam 12 is directed to a beam splitter 14. The beam splitter 14 allows the passage therethrough of a first beam portion 16, representing approximately half of the light, while reflecting another portion 18 representing the other half. The beam portion 16 is incident on a mirror 20, which reflects it back towards the beam splitter. The portion 18 is reflected by another mirror 22 which reflects this portion toward the beam splitter 14. The two beam portions 16 and 18, after return to the beam splitter from the two mirrors, are directed toward a photodetector 24.

If the two beam portions 16 and 18 travel along paths of different lengths, fringes are created in the plane of the detector. The detector 24 covers only a small area, representing a fraction of the width of a fringe. Typically, a photomultiplier is used in order to obtain an appreciable output signal at 26 from the detector.

The interferometer can be used to measure the difference in path length for the two beams 16 and 18. Typically, one mirror 22 is relatively fixed in position, while the other 20 is movable. The movable mirror is attached to an actuator 28 which can move it back and forth along the optical path, that is, toward or away from the beam splitter 14. If the movable mirror 20 is initially started at a position spaced from the center of the beam splitter by the same amount as the fixed mirror 22, no fringes are created initially. If the actuator 28 is then driven to move the movable mirror 20 slowly in one direction, fringes will cross the detector 24. Every complete fringe which crosses the detector 24 represents an additional difference in the paths of the two beam portions of precisely one wave-length of the beam 12. A change in path difference of one wavelength is accomplished by movement of the mirror 20 by a half wavelength, in the case of a simple mirror. Since the wavelength of the source output is known with great accuracy, as in the case of a laser source, the change in position of the mirror 20 can be determined with great accuracy.

Accurately controlled movement of the movable mirror 20 can be useful to control the movement of a precision machine element, or to establish a predetermined path difference to enable analysis of other radiation introduced into the interferometer. Generally, flat mirrors are not used, but instead retroreflector mirrors such as corner cubes or cat's eye types are used as the interferometer reflectors to enable operation with slight misalignment.

If the actuator 28 were to move the mirror 20 continuously in one direction, the amount of movement could be readily determined. Every time the output from the detector 24 passed through another maximum, another half wavelength of movement (for a simple mirror) would be indicated. However, the movable mirror 20 may sometimes move in one direction, such as toward the beam splitter 14, and sometimes in the other direction. If a relatively large total movement of the mirror 20 occurs, such as an inch, many tens of thousands of wavelengths may be traversed. An automatic counter attached to the output of the detector 24 could not readily determine the total number of wavelengths traversed, because movements in one direction would be extremely difficult to differentiate from movements in the other direction. For example, consider the situation where the mirror 20 is at a position which results in the brightest part of a fringe falling on the detector 24. The output of the detector 24 will decrease regardless of whether the mirror 20 thereafter moves toward the beam splitter 14 or away from it, and it cannot be determined in which direction the mirror 20 is moving.

In accordance with the present invention, provisions are included to enable a determination of the direction of movement of the mirror 20. This is accomplished by deriving two signals, each of which varies in accordance with the movement of the fringe across the detector 24. However, the signals are in quadrature, that is, they vary 90° out of phase with each other. Thus, while one signal is reaching a minimum value (e.g., the detector output is a minimum when the darkest part of a fringe is on the detector), the other is reaching a value inbetween its minimum and maximum values. The two quadrature signals are delivered to direction recognition circuitry which recognizes the direction of mirror movement. The recognition circuitry drives a reversible counter which provides a net count of the fringes traversed, thereby indicating the total movement of the movable mirror.

The generation of the two quadrature signals is accomplished by mounting one of the mirrors, such as the fixed mirror 22 on a transducer 30. This enables vibration of the mirror 22 back and forth along the optical path. The transducer 30 couples the fixed mirror 22 to the frame 32 of the interferometer, or other fixed support. A high frequency oscillator 34 generates a signal of a frequency $F_0$ which is delivered to the transducer 30 to drive it. Accordingly, the fixed mirror 22 is vibrated at the frequency $F_0$ along the optical path. The amplitude of the vibrations is extremely minute, being only a small fraction of a wavelength. Thus, the vibration of the fixed mirror 22 results in only a small oscillation of the output from the detector 24.

The frequency $F_0$ of the high frequency oscillator 34 is very high in comparison with the speed at which the actuator 28 moves the movable mirror. That is, the movable mirror moves slowly enough that a great number of oscillations at frequency $F_0$ occur in the period required for one fringe width to move across the photodetector. For example, $F_0$ may be a frequency of 500 kHz., and this signal may vibrate the mirror 22 with an amplitude of $\frac{1}{100}$ of one wavelength of the light 12, while the movable mirror 20 may cause entire fringes to cross the detector at a maximum rate of only 20 thousand fringes per second. Accordingly, in the following discussion, the average value of the photodetector output is intended to represent the direct current output for a fixed position of the movable mirror, or the component of a frequency substantially below $F_0$ but above the maximum frequency (e.g., 20 kHz.) at which entire fringes can pass across the photodetector.

The output line 26 of the detector leads to a direct current amplifier 36 which provides a signal of appreciable amplitude to facilitate processing. The output of the amplifier is passed through a high pass filter 38 whose output is delivered to a demodulator 40. In the demodulator 40, this high frequency signal is multiplied by the output of the high frequency oscillator 34. The output product signal of the demodulator 40 is passed through a low-pass filter 42 to obtain its low frequency or average component. This component will be constant for a given position of the movable mirror 20. The output of the filter 42 is delivered to a direction recognition circuit 45 which drives a reversible counter 47. The direction recognition circuit and reversible counter are generally portions of a direction sensitive counter 44.

The output of the direct current amplifier 36 is also passed directly through a second low-pass filter 46. The output of filter 46, like the output of the other low-pass filter 42, is constant for a given position of the movable mirror 20. The filtered signal from the second low-pass filter 46 is also delivered to the direction recognition circuit 45 of the direction sensitive counter 44.

The outputs of the low-pass filters 42 and 46 vary between a minimum and maximum value for a change in path difference of a half wavelength (representing a movement of a simple movable mirror 20 of a quarter wavelength). However, the amplitude of the outputs of the low-pass filters are in quadrature, that is, they are 90° out of phase with each other. Accordingly, when the output from filter 42 is passing through a maximum, the output from the other filter 46 is passing through an amplitude half-way between its maximum and minimum. The quadrature relationship enables the direction sensitive counter 44 to determine the direction in which the movable mirror 20 is moving.

A direction sensitive counter, such as that shown at 44, is a well known instrument for providing a net count of the 360° phase variations of signals which may vary in phase in either direction. The counter requires two input signals whose phases vary in unison, but which are constantly out of phase with each other, preferably on the order of 90°. In the case of such signals, when one signal is passing through a maximum or minimum, the other is passing through a value inbetween its maximum and minimum. One example of a direction sensitive counter which can be used is the model 5280A reversible counter manufactured by the Hewlett-Packard Co. of Palo Alto, Calif.

An understanding of the manner of generation of two quadrature signals, that is, two signals whose amplitudes vary in accordance with mirror movement, but which are 90° out of phase with each other, can be obtained by considering the waveforms generated by the apparatus. FIG. 4 illustrates the voltage level of the photodetector output at various positions of the movable mirror. When the movable mirror is at a position which results in the photodetector being at the darkest part of a fringe, the photodetector output is of a value shown at L, which is substantially zero. Due to the vibration of the fixed mirror, the output of the photodetector rapidly varies between the points $a$ and $c$ around the center point $b$ of position L.

When the moving mirror moves toward the beam splitter by $\frac{1}{8}$ wavelength, which changes the path difference by $\frac{1}{4}$ wavelength, the output of the photodetector is of an amplitude shown at position M. The average output is at the point $b$ of the position M. However, due to the variations of the fixed mirror, the detector output actually varies between the amplitudes at points $a$ and $c$ of position M. When the moving mirror moves another $\frac{1}{8}$ wavelength towards the beam splitter, the output of the detector is as shown at position N. Further movement results in a decrease in detector output to that shown at position O and finally to that of position P. The position P represents a change in path difference of one wavelength from position L. At all of the positions M through P, the output of the photodetector oscillates slightly because of the vibrations between the points $a$, $b$, and $c$ at each position.

FIG. 5 illustrates the waveform of the oscillator output, showing its variation with time. When the oscillator output is zero, indicated by the points $b$, the fixed mirror is at a center position. When the oscillator output is a maximum, as shown at point $c$ on the waveform of FIG. 5, the fixed mirror is closest to the beam splitter, and when the voltage is a minimum, as shown at point $a$, the fixed mirror is furthest from the beam splitter.

FIG. 6 illustrates the waveforms of the photodetector output for various positions of a fringe on the detector. The waveform 50 shows the detector output for the position L of FIG. 4. It can be seen that the average output of the detector is low and that the alternating current output is pimarily the second harmonic of the oscillator frequency signal shown in FIG. 5. Waveform 52 shows the detector output at the position M, which is inbetween the darkest and brightest portions of a fringe. It can be seen that there is a large average output, and the alternating current output is primarily a wave of the frequency $F_0$ of the oscillator, whose output is shown in FIG. 5.

The waveform 54 represents the detector output at the position N which is the brightest part of a fringe. The output at this position has a maximum average level and has an alternating current component which is of the second harmonic frequency of the oscillator, and which is 180° out of phase with the AC output obtained at the position L. Waveform 56 represents the output for the position O, which has an AC component which is primarily of the oscillator frequency, but which is 180° out of phase with it. Finally, the waveform 58 represents the output at the darkest part of the next fringe, which is at position P.

FIG. 7 shows the average values 60 through 68 of the detector outputs at the various positions L through P. It can be seen that the average detector output varies from a minimum at the darkest part of a fringe, as shown at 60 and 68 for positions L and P, to a maximum at the brightest part of the fringe, shown at 64 for position N.

FIG. 8 illustrates the high frequency components 70 through 78 in the outputs of the detector. These are the outputs obtained from the high frequency filter 38 in the apparatus of FIG. 1. These waveforms are also the AC portions of the waveforms of FIG. 6. FIG. 9 is an illustration of the product obtained by multiplying the output of the high frequency oscillator 34 of FIG. 1, which has a frequency $F_0$, by the high frequency output of the photodetector. The resulting waveforms 80 through 88 represent the output of the demodulator 40 of FIG. 1.

FIG. 10 illustrates the average value of the product signals of FIG. 9. At the position L, the average value of the product signal 80 is zero, as shown at 90 in FIG. 10. At the position M, the average value of the product signal 82 is a maximum, having the value shown at 92 in FIG. 10. At a position N, the average value of the product signal is again zero, as shown at 94. At position O, the average value 96 is a minimum, that is, it attains its maximum negative value. Finally, at position P, the average value signal 98 is again zero.

Waveform 100 of FIG. 11 illustrates the variation in the average output of the photodetector for various positions L through P of the center of a fringe. This is the output of the low-pass filter 46 of FIG. 1, and represents the values shown in FIG. 7, with respect to position. Waveform 102 represents the average values of the product signals, these average values being obtained from the low-pass filter of FIG. 1. The waveform 102 also represents the average values shown in FIG. 10, with respect to position. It can be seen that the waveforms 100 and 102 are 90° out of phase with each other, at every position of a fringe on the photodetector. This 90° difference enables the reversible counter 44 of FIG. 1 to sense the direction of movement of the movable mirror. Thus, if the fringe position is at N, so that the average output is a maximum, and, at this point the movable mirror reverses, this fact can be detected. The fact that the signal 102 does not continue to decrease to a negative value, but instead increases indicates that the fringe is moving back toward the position M rather than forward toward the position O.

FIG. 2 illustrates another embodiment of the invention, wherein another signal is substituted for the average output of the photodetector. As will be explained, the substituted signal is derived from the second harmonic component $2F_0$ in the output of the detector 24. Like the average output of the detector, this substituted signal is 90° out of phase with the fundamental product signal derived by demodulating the detector output by $F_0$. Thus, the substituted signal is either in phase or 180° out of phase with the direct average output of the detector or, in other words, is in 180° phase synchronism with it.

The apparatus of FIG. 2 is similar to that of FIG. 1, including a source 10 which provides a monochromatic beam 12. The beam is split into a first portion 16 that is reflected by a movable mirror 20 and a second portion 18 that is reflected by a fixed mirror 22. The two beam portions are recombined, and the fringes created fall on the detector 24. The movable mirror 20 is moved large distances by an actuator 28 while the fixed mirror is vibrated by a transducer 30. The circuitry for driving the fixed mirror and processing the output of the detector, however, is different from the circuitry of FIG. 1.

The signal for driving the fixed mirror is originally generated by a second harmonic oscillator 110 whose output is of a frequency $2F_0$. This frequency is twice as high as the frequency which drives the fixed mirror transducer 30. The output of the oscillator 110 is divided by a divider 112, whose output of frequency $F_0$ is delivered to the transducer 30 to vibrate the fixed mirror. The output of the photodetector 24, after amplification by an amplifier 114, is passed through a high pass filter 116. The high pass filter 116 is used because only the fundamental frequency $F_0$ and second harmonic frequency $2F_0$ are used.

The output of the filter 116 enters two demodulators 118 and 120. The first demodulator 118 receives the fundamental frequency $F_0$ from the divider 112 and produces an output which is passed through a low-pass filter 122 to a direction sensitive counter 124, similar to the counter 44 of FIG. 1. The waveforms in the output of the demodulator 118 and filter 122 are the same as those of the demodulator 40 and filter 42 of FIG. 1. The output of the low-pass filter 122 is 90° out of phase with the average output of the photodetector 24.

In the demodulator 120, the output of the filter 116 is multiplied by the second harmonic signal $2F_0$ generated by the oscillator 110. The demodulator 120 produces a signal with a large second harmonic component. This signal has an average value which varies in phase with the average output of the photodetector (or 180° out of phase with it). By passing the output of the demodulator 120 through a low-pass filter 126, a signal is obtained which varies in phase with the average output of the detector. This signal is 90° out of phase with the signal from the other low-pass filter 122. By entering the outputs of both filters 122 and 126 into the direction sensitive counter 124, the counter can provide a net count indicating the net change in position of the movable mirror 20. The output of the low-pass filter 126 is shown at 103 in FIG. 11. It can be seen that waveform 103 is 90° out of phase with variations in the output of the other low-pass filter 122, the output of filter 122 being shown at 102.

FIG. 3 shows an interferometer, constructed in accordance with the invention, which illustrates a typical application of the invention. The interferometer of FIG. 3 is used for measuring the various wavelength components in a light beam 150 to be analyzed. The beam passes through a slit 152 and is divided into two portions by a beam splitter 154. One portion 150' continues towards a first mirror means 156, while the other portion 150" is directed towards a second mirror means 158. Both mirror means are cat's eye retroeflectors having a parabolic primary mirror nnd a small flat secondary mirror, such as mirrors 160 and 164 of the retroreflector 156.

Both beam portions 150' and 150" are reflected by a primary mirror to the secondary, then back to the primary, and then to an end mirror 168 and 172. The two beam portions then pass back along the same path by which they reached the end mirrors, are recombined at the beam splitter 154, and are both directed towards a main photodetector 170.

The recombined beam portions 150' and 150" create fringes at the main photodetector 170. The output 174 of the photodetector has an amplitude representing primarily one wavelength component of the radiation 150 being analyzed. The particularly wavelength represented on the output 174 depends upon the exact path difference for the two beam portions 150' and 150". In order to determine the exact path difference, a laser 182 is used to generate a beam 184 of known wavelength. The beam is reflected by a mirror 186, and it is divided by the beam splitter 154 to provide two portions which travel to the two mirror means. The reference beam portions are recombined and fall on a reference photodetector 188. When the darkest area of a fringe covers the reference photodetector 188, the exact path difference for beam portions traveling to the two mirror means is known with high precision.

In order to completely analyze the beam 150, the first mirror means 156 is repeatedly moved along the optical path. It is moved by small steps representing a change in the optical path difference equal to one reference wavelength. A large number, such as 75,000 steps, may be taken for a complete analysis of the radiation 150. The output of the reference photodetector 188 is passed through a low-pass filter 189. The output of the filter is used to energize a servo driving circuit 190, whose output is delivered to a crossover network 192. The crossover network passes low frequency driving signals to an actuator 176 which moves the entire mirror means 156. High frequency driving signals are passed to a transducer 178 which couples the secondary mirror 164 to a spider 180, the spider extending across the view of the primary mirror 160. This arrangement enables rapid response to permit rapid stepping of the movable mirror, and also to enable corrections for vibrations to which the apparatus may be subjected.

As mentioned above, the movable mirror means 156 may undergo many thousands of steps. Each step represents a movement of one fringe, created by the reference beam, over the reference photodetector 188. A direction sensor circuit indicated at 194 enables a count of the net steps of movement of the movable mirror means 156 each of these steps representing a path length difference equal to one wavelength of the reference beam from the laser. A high frequency oscillator 196 has an output which is used to vibrate the fixed mirror means 158 back and forth along the optical path. This is accomplished by mounting the secondary mirror 166 on a transducer 198, such as a piezoelectric crystal. In many cases, the piezoelectric crystal 198 is a part of the oscillator. The transducer 198 is attached to a spider 200 which extends across the view of the mirror means. As the secondary mirror 166 moves back and forth, the effect is the same as a movement of the entire mirror means 158 back and forth. The vibrations are of a very small amplitude and can be performed at a high frequency such as one megacycle.

The direction sensor circuit 94 receives the output of the reference photodetector 188. This output is passed through a low pass filter 202 to derive an average signal which varies in amplitude in phase with the movement of fringes over the reference photodetector 188. The cut-off frequency of low-pass filters 189 and 202 are approximately the same. The output of the reference photodetector is also passed through a high pass filter 204 to demodulator 206 where it is demodulated by the output of the high frequency oscillator 196. This product signal is passed through a low-pass filter 208 to obtain an average signal whose amplitude varies 90° out of phase with the variation in amplitude of the other low pass filter 202.

The quadrature signal outputs of the two low-pass filters 202 and 208 are entered into a direction sensitive counter 210 which provides a net count of the number of fringes passing the reference photodetector 188.

The net count of the counter 218 represents the net movement of the movable mirror 156, and also represents the net path difference for beams going to the two mirror means. By noting the net count on the counter 210 at each sampling of the output 174 of the main photodetector 170, the particular wavelengths in the radiation 150 to be analyzed can be determined.

Although particular embodiments of the invention have been described and illustrated herein, it is recognized that modifications and variations may readily occur to those skilled in the art, and, consequently, it is intended that the claims be interpreted to cover such modifications and equivalents.

What is claimed is:
1. In an interferometer including a pair of reflector means for defining a path length difference which causes the generation of fringes at a fringe detector, the improvement of apparatus for sensing the direction of change of path length difference of said interferometer comprising:
  second-harmonic generator means for generating a signal which is the second-harmonic of a fundamental frequency signal;
  divider means coupled to said second-harmonic generator means for generating a signal representing said fundamental frequency signal;
  means coupling the output of said divider means to a first of said reflector means to oscillate it at said fundamental frequency;
  first demodulator means having inputs coupled to said divider means and said fringe detector for generating a first indicating signal; and
  second demodulator means having inputs coupled to said second-harmonic generator means and said fringe detector for generating a second indicating signal, whereby to generate two indicating signals out of phase by 90° with each other with respect to movement of fringes across said fringe detector.

2. The interferometer described in claim 1 including:
  high pass filter means for coupling said fringe detector to said first and second demodulator means, for passing only signal components of a frequency above the highest expected frequency of complete fringe movements across said fringe detector.

3. An interferometer comprising:
  means for supplying a substantially monochromatic light beam;
  beam splitter means for creating two beam portions which travel in two different directions;
  first and second mirror means for returning said beam portions to said beam splitter means;
  detector means responsive to the amplitude of fringe area created by said beam portions upon their return;
  means for oscillating one of said mirror means at a predetermined fundamental frequency to create an oscillation of fringes at said detector means with amplitudes of oscillation which are a fraction of the width of one fringe, including first generating means for generating a signal of twice the frequency of said fundamental frequency, second generating means coupled to said first generating means for generating a signal of said fundamental frequency, and transducer means coupled to said first generating means for oscillating one of said mirror means at said fundamental frequency;
  actuator means for moving one of said mirror means at a speed which moves fringes past a given point on said detector means at no greater than a second frequency substantially less than said fundamental frequency;
  high pass filter means coupled to the output of said detector means for passing components of a frequency above said second frequency;
  first demodulator means coupled to said high pass filter means and said first generating means for deriving a fundamental frequency product signal containing the product of the inputs thereto;
  first low pass filter means coupled to said first demodulator means for passing only components below said fundamental frequency;
  second demodulator means coupled to said high pass filter means and said second generating means for deriving a second-harmonic frequency product signal containing the product of the inputs thereto; and
  second low pass filter means coupled to said first demodulator means for passing only components below said fundamental frequency, whereby to obtain signals which vary with movements of said mirror means but which are 90° out of phase with each other with respect to such movements.

4. A method for sensing the directional change of path length difference in an interferometer wherein a pair of reflector means direct light over two different paths onto a fringe detector, comprising:
  generating a first signal of a first frequency;
  dividing said first signal to obtain a second signal of lower frequency and in a predetermined phase relationship to said first signal;
  vibrating a first of said reflector means along its path by said second signal to produce corresponding high frequency variations in the output of said fringe detector;
  demodulating high frequency components of the output of said fringe detector with said first signal to obtain a first indicating signal; and
  demodulating high frequency components of the output of said fringe detector with said second signal to obtain a second indicating signal, whereby to derive a pair of indicating signals whose average values vary in accordance with the position of said first reflector means but which are maintained about 90° out of phase with each other.

5. A method for counting fringes moving past a fringe detector of an interferometer that has a pair of mirror means for directing light along two paths comprising:
generating a first signal of first frequency;
generating a second signal which is a predetermined fraction of the frequency of said first frequency and in constant phase relationship therewith;
vibrating a first of said mirrors by said second signal;
deriving high frequency components in the output of said fringe detector;
multiplying said high frequency components of said fringe detector by said first signal, to derive a first product signal;
multiplying said high frequency components of said fringe detector by said second signal, to derive a second product signal; and
coupling said first and second product signals to a reversible counter.

References Cited

UNITED STATES PATENTS 3,409,375 11/1968 Hubbard _____ 356—106
3,428,816 2/1969 Jacobs et al. _____ 356—106 X RONALD L. WIBERT, Primary Examiner T. MAJOR, Assistant Examiner